(12) United States Patent
Kurz et al.

(10) Patent No.: US 8,152,174 B2
(45) Date of Patent: Apr. 10, 2012

(54) QUICK CHUCKING UNIT, WITH SEALING UNIT, AND QUICK CHUCKING SYSTEM

(75) Inventors: Friedrich Kurz, Nordheim (DE);
Johann Gross, Heilbronn (DE)

(73) Assignee: Schunk GmbH & Co. KG Spann- und Greiftechnik (DE)

( * ) Notice: Subject to any disclaimer, the term of this patent is extended or adjusted under 35 U.S.C. 154(b) by 1253 days.

(21) Appl. No.: 11/882,768

(22) Filed: Aug. 6, 2007

(65) Prior Publication Data
US 2008/0036163 A1 Feb. 14, 2008

(30) Foreign Application Priority Data
Aug. 8, 2006 (DE) .................... 10 2006 037 708

(51) Int. Cl.
*B23B 31/107* (2006.01)
(52) U.S. Cl. ...................... 279/4.12; 279/121
(58) Field of Classification Search ............. 279/4.04, 279/4.1, 4.11, 4.12, 4.06, 121; 409/231, 409/232
See application file for complete search history.

(56) References Cited

U.S. PATENT DOCUMENTS

| 4,585,369 A | * | 4/1986 | Manesse et al. ........... 403/322.3 |
| 5,522,605 A | | 6/1996 | Lewis |
| 6,160,236 A | * | 12/2000 | Nordquist ................. 219/69.15 |
| 6,637,755 B2 | | 10/2003 | Chen |

FOREIGN PATENT DOCUMENTS

| DE | 80 14 064 | 8/1980 |
| DE | 103 17 336 | 11/2004 |

* cited by examiner

*Primary Examiner* — David Bryant
*Assistant Examiner* — Paul M Janeski
(74) *Attorney, Agent, or Firm* — Paul Vincent

(57) ABSTRACT

The invention relates to a quick chucking unit with a chuck receptacle formed by a basic body, with at least one chucking element that can move relative to the basic body between an unlatched and latched position, with a cylinder and a piston element situated within the cylinder, which together with the cylinder, borders at least one pressure region, wherein pressurizing the pressure region moves the chucking element into the latched or unlatched position, wherein the piston element is designed as a piston element fixed in place relative to the basic body, and the cylinder is designed as a cylinder element that can move relative to the basic body and piston element. The invention also relates to a sealing unit for such a quick chucking unit, as well as to a quick chucking system.

10 Claims, 4 Drawing Sheets

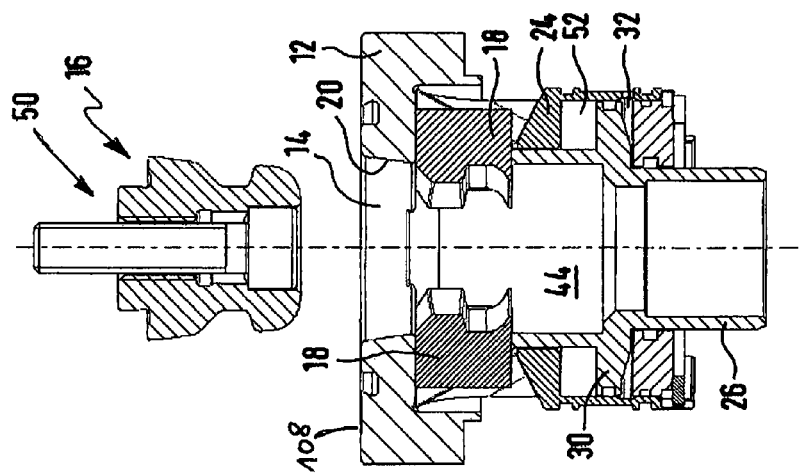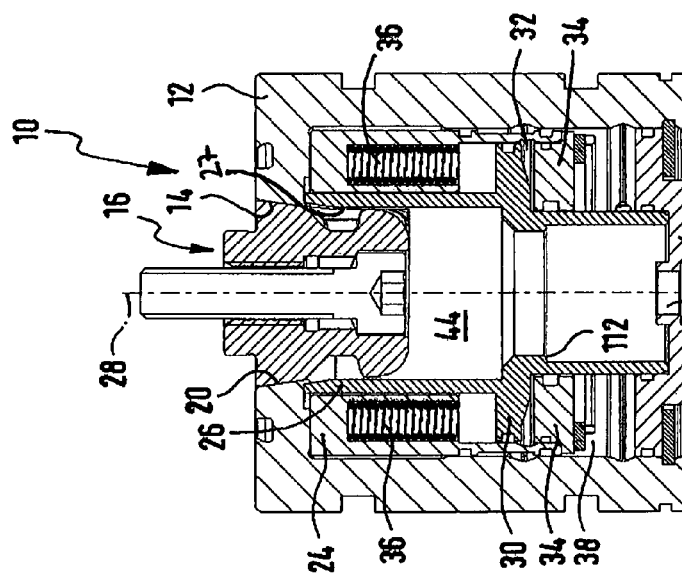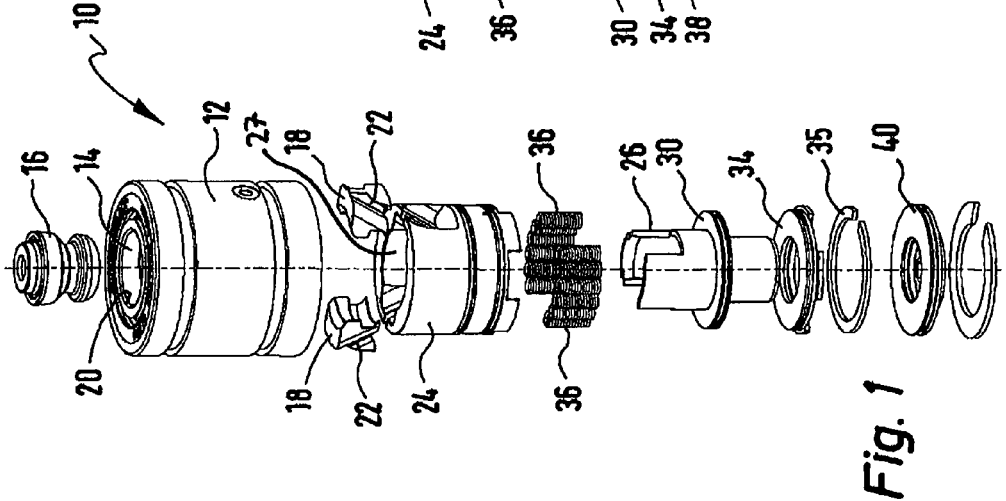

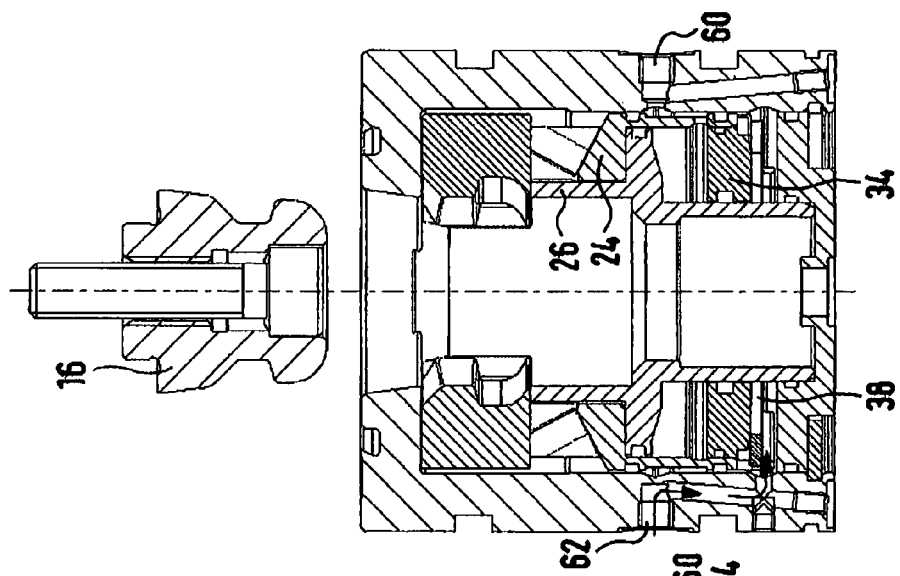
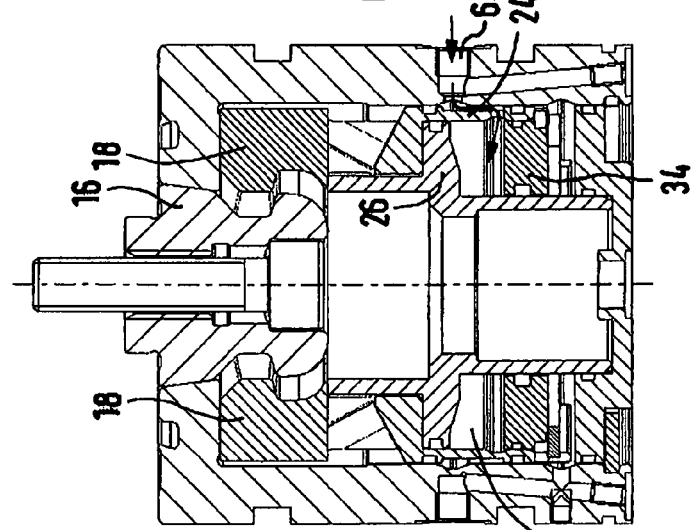
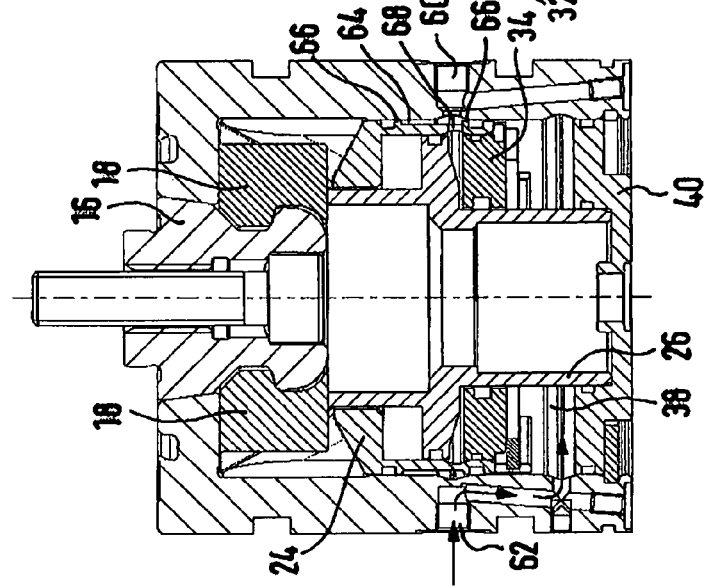

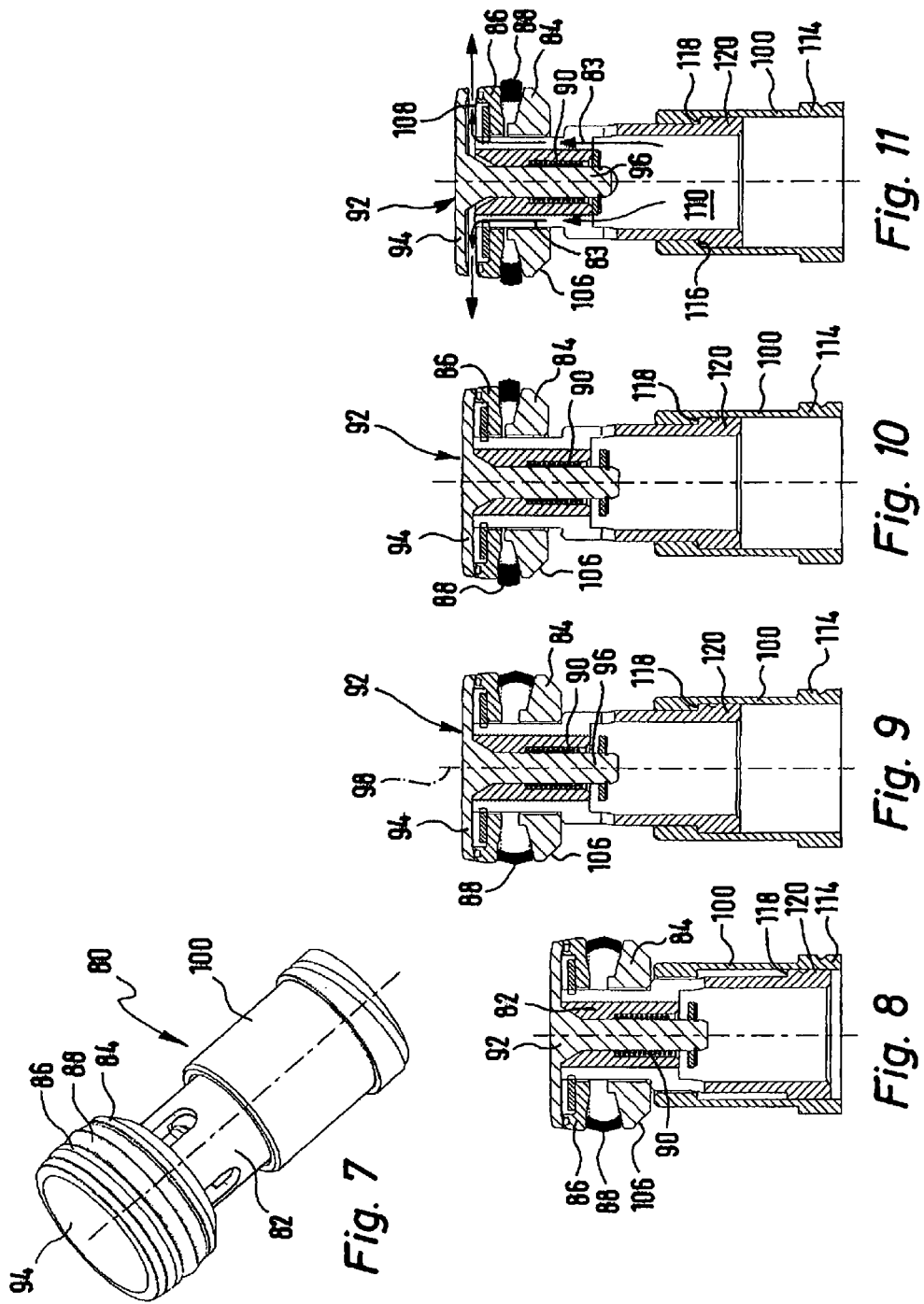

QUICK CHUCKING UNIT, WITH SEALING UNIT, AND QUICK CHUCKING SYSTEM

BACKGROUND OF THE INVENTION

The invention relates to a quick chucking unit with a chuck receptacle formed by a basic body, with at least one chucking element that can move relative to the basic body between an unlatched and latched position, with a cylinder and a piston element situated within the cylinder, which, together with the cylinder, borders at least one pressure region, wherein pressurizing the pressure area with a pressurizing means moves the chucking element into the latched or unlatched position. The invention also relates to a sealing unit for sealing the chuck receptacle of a quick chucking unit, as well as to a quick chucking system comprising a quick chucking unit and sealing unit.

The quick chucking units mentioned above are already known from prior art, e.g., form DE 103 17 336 A1 or DE 20 2004 009 283 U1. In these quick chucking units, the piston element is situated in a cylinder so that it can move axially, wherein the piston element moves the chucking element into the unlatched or latched position when the pressure area is pressurized. The chucking elements can thereby take the form of balls, pins or sliders.

SUMMARY OF THE INVENTION

The object of this invention is to propose a quick chucking unit that exhibits an advantageous design and reliable function.

Proposed for this purpose is a quick chucking unit of the aforementioned type that also exhibits the features of the independent claim. As a consequence, the piston element is designed as a piston element that is fixed in place relative to the basic body, and the cylinder is designed as a cylinder element that can move relative to the basic body and piston element. According to the invention, the cylinder element, and not the piston element, is then moved when pressurizing the pressure region with a fluidic pressurizing means, e.g., in particular compressed air or hydraulic fluid. Because a fixed piston element is provided, subassemblies or units can be arranged and secured to the piston element. In particular, the pressure region can take the form of a ring running around the piston element.

The piston element is advantageously designed as a hollow piston element. The use of a hollow piston element provides structural space within the hollow piston element for arranging subassemblies or units. The subassemblies or units can be secured directly to the inside of the hollow piston element. The hollow piston element is thereby open on at least one side, or accessible from at least one side, so that corresponding subassemblies or units can be incorporated into the hollow piston element.

The inside of the piston element designed as a hollow piston element preferably extends in an axial elongation of the chuck receptacle in order to sectionally and axially guide a pulling bolt that reaches into the chuck receptacle. In other words, the piston element, or its inside, assumes a guiding function as the pulling bolt is introduced into the chuck receptacle.

The cylinder element is thereby advantageously situated on the piston element so that it can shift axially, and directly coupled, preferably by means of inclined guides, with the chucking element for motion in order to radially move at least one chucking element. The inclined guides can thereby be designed as a wedge-shaped hook drive: as the cylinder element moves axially, the inclined arrangement of interacting guides results in a radial movement of the at least one chucking element preferably designed as a chucking slider.

To border the pressure area in an axial direction, the piston element can exhibit a continuous piston section that projects radially outward like a ring collar. This piston section advantageously tightly abuts the inner wall of the cylinder element.

According to the invention, at least one spring element can be provided for acting on the cylinder element in such a way as to hold the chucking elements in the latched position to ensure that the chucking elements can be latched independently of pressure. Several spring elements can advantageously be provided, supported on the piston section of the piston element at one end, and on the cylinder element at an other end.

To border the pressure region on the side facing away from the chuck receptacle, the cylinder element can encompass a cover element that envelops the piston element like a ring. Providing such a cover element makes it possible to achieve an advantageous assembly; the cylinder element can be pushed onto the piston element without a cover element, wherein the pressure region is then sealed by the cover element.

In another especially preferred embodiment of the invention, the basic body exhibits a cylinder area that holds the cylinder element and can be pressurized to movably accommodate the cylinder element. The cylinder element itself can move within the cylinder area, thereby receiving the function of a piston. The advantage of such a design is that the cylinder area is easily accessible to a pressure line, which ensures a reliable supply of pressure.

The pressure region can here be pressurized via a radial opening in the cylinder element, which corresponds with a pressure supply line, independently of the axial position of the cylinder element. To this end, for example, a pressure gap limited in the two axial directions, into which a compressed air line from the basic body empties, can be situated between the cylinder element and the basic body comprising the cylinder area.

The cylinder area and pressure region are here preferably designed in such a way that the chucking element assumes its latched position during pressurization of the cylinder area, and its unlatched position during pressurization of the pressure region, which happens to lie between the piston element and cylinder element.

The cylinder area can in turn be sealed on the side facing away from the chuck receptacle with a sealing element that tightly abuts the piston element. The piston element can, in particular, be arranged between the basic body and sealing element under an initial load. In addition, the sealing element can exhibit a passage toward the inside of the piston element, designed as a hollow piston element, at least in the area of the central longitudinal axis of the piston element. For example, a corresponding subassembly or corresponding unit can be introduced via this passage into the hollow piston element and/or electric lines can be passed through this passage.

Stops or attachment sections for subassemblies or units to be incorporated in the hollow piston element can be provided inside the hollow piston element. This permits a reliable and accurate positioning of the subassemblies or units inside the hollow piston element.

The object mentioned at the outset is also achieved by means of a sealing unit to be situated in a chuck receptacle, which closes the chuck receptacle of a quick chucking unit, in particular, a quick chucking unit according to the invention. Such a sealing unit has a pressure element that can be moved to a sealed position from an insertion position in which it can be introduced into the chuck receptacle. In addition, such a sealing unit exhibits an elastic sealing element, which is pressed by the pressure element against the area of the basic body enveloping the chuck receptacle with the pressure element in the sealed position. In the insertion position, the diameter of the pressure element with the sealing element is smaller than the chuck receptacle, making it possible to introduce the pressure element with sealing element into the chuck receptacle. By shifting the pressure element into the sealed position, the elastic sealing element is pressed, in particular, radially outward against the radially inward section of the basic body comprising the chuck receptacle.

To shift the pressure element from the insertion position to the sealed position, use is advantageously made of a chucking element of the quick chucking unit. Such a chucking element advantageously interacts with the pressure element in such a way that the chucking element brings the pressure element into the sealed position while the chucking element is moved to its latched position. To this end, inclined guides can be secured, in particular to the pressure element or to the chucking element, which transfer the pressure element into the sealed position as a chucking element that moves radially inward.

The pressure element can here advantageously be designed as a ring, and axially move from the insertion position into the sealed position on a carrier section. As already mentioned, corresponding inclined guides can be provided, which move the sealing element in the corresponding axial direction, given a chucking element that moves radially inward.

The sealing element is preferably designed as a sealing bellows, which is situated on the pressure element and on a ring- or plate-shaped edge of the carrier section that projects radially outward. The diameter of the sealing bellows is smaller with the pressure element in the insertion position than when moving the pressure element axially into the sealed position. The increasing diameter of the sealing element as the pressure element moves into the sealed position makes it possible to seal the chuck receptacle.

The carrier section as such can provide a valve body that is axially exposed to an initial stress by a spring, which is arranged in the carrier section, and which extends through the carrier section, through which compressed air can escape from the carrier section given an excess pressure inside the sealing unit, in particular to remove chips and contaminants in the area of the chuck receptacle.

The valve body can here encompass a valve plate supported on the upper side of the carrier section, along with a carrier section that extends in an axial direction through the carrier section. The valve body can have a T-shaped cross section. In addition to sealing the chuck receptacle with the sealing unit, providing such a valve body makes it possible to remove chips and contaminants in the area of the chuck receptacle of an accompanying chucking unit.

Another preferred embodiment of the invention provides a spring element that pushes the carrier section from a resting position to an activation position in the chuck receptacle and/or holds the carrier section in the activation position upon removal of a pulling bolt introduced in the chuck receptacle. If the carrier section is in the activation position, and a pulling bolt is introduced into the chuck receptacle in this activation position, the pulling bolt moves the carrier section into the resting position against the force of the spring. The resting position is thereby located inside the chuck receptacle. The spring element can be supported on the quick chucking unit or its basic body or sealing element and on the carrier section or an adapter situated between the carrier section and spring element. The advantage of providing such a spring element is that the carrier section can be automatically shifted to the activation position while removing the pulling bolt from the chuck receptacle. For example, if the at least one chucking element is also automatically shifted to the latched position by providing corresponding spring elements, the pressure element can be brought into the sealed position as a result, so that the sealing element seals the chucking element to a largely tight extent. This prevents chips or contaminants from getting into the chuck receptacle or into the quick chucking unit.

The carrier section can be guided from the resting position to the activation position and from the activation position to the resting position by means of a telescoping adapter, which, in particular, can rest against the quick chucking unit or on the inside of the piston element. The adapter can resemble a sleeve, wherein the spring element that moves the adapter into the activation position can be situated inside the adapter and act directly on the carrier section. The sealing unit according to the invention is provided, in particular for purposes of accommodation, in the piston element designed as a hollow piston element of a quick chucking unit according to the invention.

The object specified at the outset is also achieved with a quick chucking system comprising a quick chucking unit according to the invention and a sealing unit according to the invention situated therein.

Additional details and advantageous embodiments of the invention can be gleaned from the following specification, based on which the embodiments of the invention shown in the figures are described and explained in greater detail.

BRIEF DESCRIPTION OF THE DRAWING

FIG. 1 is a first chucking unit according to the invention in exploded view;

FIG. 2 is a longitudinal section through the chucking unit according to FIG. 1;

FIG. 3 is a second quick chucking unit according to the invention;

FIG. 4-6 are various operating states of the chucking unit according to FIGS. 1 and 2;

FIG. 7 is a perspective view of a sealing unit according to the invention;

FIG. 8-11 are various operating states of the sealing unit according to FIG. 7;

DESCRIPTION OF THE PREFERRED EMBODIMENT

Figure 14:
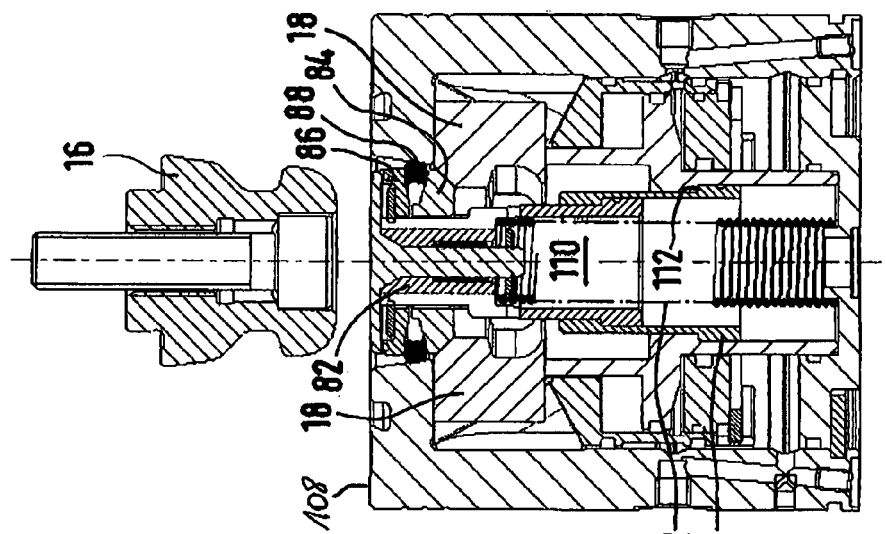
FIG. 12-14 is a chucking system according to the invention in various operating states.

The quick chucking unit 10 shown on FIGS. 1, 2, 4-6 comprises a basic body 12, which has a chuck receptacle 14. The chuck receptacle 14 can accommodate a pulling bolt 16, which can be latched in the quick chucking unit 10 by means of two opposing chucking elements 18 designed as chucking sliders. The pulling bolt 16 is here shown in a latched position in FIGS. 2 and 4, and in an unlatched position in FIGS. 5 and 6.

To make it easier to introduce the pulling bolt 16 into the chuck receptacle 14 and additionally achieve a concentric gripping of the pulling bolt 16, the area 20 of the basic body 12 that forms the chuck receptacle 14 is slightly conical.

The two chucking elements 18 can be moved in a radial direction toward each other into a latched position and away from each other into an unlatched position in order to latch the pulling bolt 16. To this end, the chucking elements 18 define inclined guides 22, which interact with corresponding inclined guides, which are provided on a cylinder element 24 that can shift in an axial direction relative to the basic body 12. The cylinder element 24 is here situated on a piston element designed as a hollow piston element 26 so that it can axially shift. The hollow piston element 26 is fixed concentrically around the central longitudinal axis 28 relative to the basic body 12, and exhibits a piston section 30 that projects radially outward like a ring collar.

The cylinder element 24 has a cover element 34 that envelops the hollow piston element 26 like a ring in order to border a pressure area 32 between the hollow piston element 26 or its piston section 30 and the cylinder element, wherein said pressure area can be pressurized with a pressurizing means, in particular compressed air or hydraulic fluid. The cover element 34 is secured to the cylinder element 24 by means of a straining ring 35.

As further evident from FIG. 2, the side 27 of the hollow piston element 26 facing the chuck receptacle 14 extends in an elongation of the chuck receptacle 14, and is used to axially guide the pulling bolt 16 that reaches into the chuck receptacle 14. The upper edge of the hollow piston element 26 provides inclined guides as an insertion aid for the pulling bolt 16.

As is evident in particular from FIGS. 1 and 2, several spring elements 36 are arranged coaxially around the central longitudinal axis 28 between the cylinder element 24 and piston section 30 of the hollow piston element 26, which exert an axially upward force on the cylinder element 24. The cylinder element 24 is situated inside a cylinder area 38 on the basic body so that it can axially move. The cylinder area 38 is sealed by means of a sealing element 40 on its axially lower side, which fixes the hollow piston element 26 to the basic body 12. One face of the hollow piston element 26 acts against the basic body 12, while the other face of the hollow piston element 26 acts against the sealing element 40.

The sealing element 40 has a passage 42 toward the interior space 44 of the hollow piston element 26 in the area of the central longitudinal axis 28. As depicted on FIG. 12-14, the interior space 44 can be provided with a sealing unit for sealing the chuck receptacle 14. In addition, other subassemblies or units can be arranged in the interior space 44, e.g., a monitoring camera or monitoring sensors.

The quick chucking unit 50 shown in FIG. 3 essentially corresponds to the quick chucking unit 10 according to FIGS. 1 and 2, wherein corresponding components are labeled with corresponding reference numbers. The fundamental difference is that the basic body 12 does not exhibit a cylinder area 38 for the cylinder element 24. Rather, the side of the piston section 30 facing away from the pressure area 32 is provided with a second pressure area 52, which can be pressurized to move the cylinder element 24 axially upward. The pressure space 32 can be pressurized to move the cylinder element 24 axially downward. The hollow piston element 26 can here be flanged to the basic body 12.

FIG. 4-6 show various operating states of the quick chucking unit 10 according to FIGS. 1 and 2. FIG. 4 depicts the quick chucking unit 10 with a pulling bolt 16 latched in the chuck receptacle 14. The chucking elements 18 are here situated in their radially inward latched position. Even without pressurizing the cylinder area 38, the force exerted by the spring elements 36 automatically maintains this latched position. If the pressure area 32 is pressurized via a pressure line 60 connected with the pressure area 32 as shown on FIG. 5, the cylinder element 24 moves axially downward. The inclined guides 22 simultaneously move the chucking elements 18 radially outward to their unlatched position. This releases the pulling bolt 16, so that it can be removed from the chuck receptacle 14, as depicted in FIG. 6.

The pressure area 32 is relieved of pressure in order to shift the chucking elements 18 out of the unlatched position into the latched position. To enhance the force applied by the spring elements 36, the cylinder area 38 is pressurized via a pressure line 62 also provided in the basic body 12 (see FIGS. 4 and 6). By contrast, the pressure area 52 is pressurized to move the cylinder element axially upward in the quick chucking unit 50 according to FIG. 3.

To pressurize the pressure area 32 with the cylinder element 24 in any position on the hollow piston element 26, the cylinder element 24 has an intermediate pressure area 64 on its radially outer side that is bordered axially from above and axially from below by two continuous ring collars 66. The intermediate pressure area 64 is situated in such a way as to correspond with the pressure line 60 in any pressure setting of the cylinder element 24. The area of the intermediate pressure area 64 is provided with a passage 68, through which the pressure means gets into the pressure area 32.

FIG. 7-11 show a sealing unit 80 to be arranged in the interior space 44 of the chucking unit 10 according to FIGS. 1, 2 and 4-6. The sealing unit 80 here encompasses an annular pressure element 84 that can move on a carrier section 82 axially between an inserted position shown in FIGS. 8 and 9 and a sealed position shown in FIGS. 10 and 11. A bellows-type elastic sealing element 88 is arranged between the pressure element 84 and a radially projecting edge 86 of the carrier section 82. The carrier section itself can consist of several parts, as depicted in the figures.

With the pressure element in the inserted position, the sealing element 88 projects only insignificantly, if at all, radially past the pressure element 84 or the edge 86. In the sealed position of the pressure element shown in FIGS. 10 and 11, the sealing element 88 is pressed radially outward, and projects radially past the pressure element 84 and the edge 86.

As is evident from FIG. 8-11, the carrier section 82 accommodates a sealing body 92 arranged below in the carrier section 82 under the initial stress of a spring 90. The sealing body 92 encompasses a sealing plate 94 extending in a radial direction, which covers almost all of the upper side of the carrier section 82. In addition, the sealing body 92 encompasses a sealing rod 96 extending in an axial direction, which runs in the area of the central longitudinal axis 98 and passes axially through the carrier section 82. When the pressure inside the carrier section 82 increases, the sealing body 92 lifts from the upper side of the carrier section 82 when incorporated in a chucking unit, allowing air 83 to stream radially out from inside the carrier section 82 between the sealing plate 94 and upper side of the carrier section, as denoted on FIG. 11. This makes it possible to remove chips and contaminants.

The carrier section 82 with sealing body 92 and pressure element 84 can be shifted axially upward from a resting position depicted in FIG. 8 into an activation position illustrated in FIGS. 9-11. To this end, a telescoping adapter 100 is provided for specifically guided motion, which interacts with the carrier section 82, and with the hollow piston element 26 when incorporated in the chucking unit 10, as depicted in FIGS. 12-14.

Figure 13:
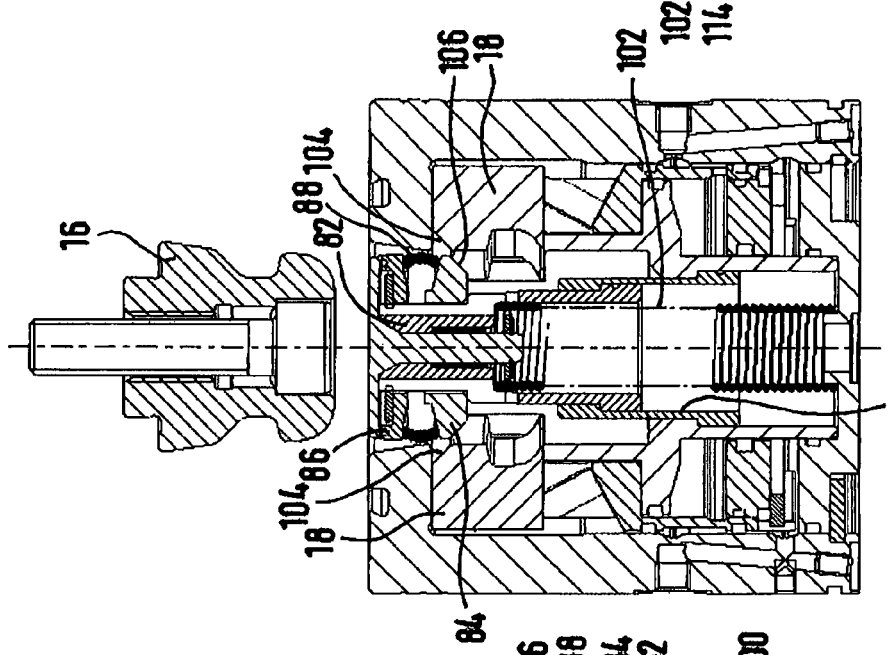
Figure 12:
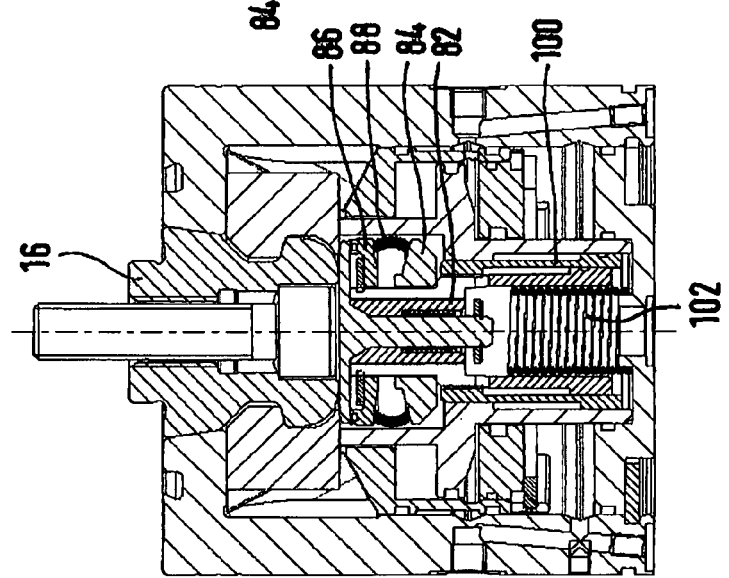

In FIG. 12-14, the sealing unit shown in FIG. 7-11 is used in the quick chucking unit depicted on FIGS. 1, 2 and 4-6. The sealing unit is completely within the interior space 44 of the hollow piston element 26. A spring element 102, supported on the inside of the sealing element 40 and on the side of the carrier section 82 facing the sealing element 40, shifts the adapter 100 and the carrier section 82 from the resting position into the activation position. The resting position of the carrier section 82 is shown in FIG. 12, wherein the pulling bolt 16 is arranged in the quick chucking unit 10 in the latched state in this position. When the chucking elements 18 are shifted to their unlatched position by pressurizing the pressure area 32, and the pulling bolt is removed from the chuck receptacle 14 in an axial direction, the spring element 102 causes the carrier section 82 to move into the activation position, in which it is located in the chuck receptacle 14, as depicted in FIG. 13. However, there still remains a gap between the area 20 of the basic body bordering the chuck receptacle 14 and the packing element 88 in this state. If the chucking elements 18 are shifted to their latched position, e.g., as the result of force exerted by the spring elements 36 and/or pressurization of the cylinder area 38, as depicted in FIG. 14, the pressure element 84 is moved axially upward into the sealed position by the chucking elements 18. To this end, the chucking elements 18 are provided with inclined guides 104, and a conical guide section 106 that corresponds with the inclined guides 104 provided on the pressure element 84.

As evident from FIG. 14, the sealing element 88 is pressed radially outward, and at least to a large extent tightly, against the wall 20 of the basic body bordering the chuck receptacle 14 with the pressure element 84 in the sealed position. This prevents chips or contaminants from penetrating into the quick chucking unit 10 via the chuck receptacle 14.

In order to axially limit the stroke of the adapter 100 within the hollow piston element 26, the hollow piston element 26 has a continuous stop 112, which interacts with a ring collar 114 located at the adapter with the carrier section 82 or adapter 100 in the activation position, as shown on FIG. 14. Accordingly, the axially upper end of the adapter 100 exhibits an inwardly projecting stop 116, which, in the activation position, interacts with a ring collar 120 that is situated on the lower side of the adapter 82 and exhibits a counter-stop 118, as shown in FIGS. 9, 10, 11 and 13, 14.

As explained on FIG. 11, in order to remove contaminants or chips arising on the upper side 108 of the basic body 12, the interior space 110 of the carrier section 82 or hollow piston element 26 can be pressurized with compressed air, thereby lifting the sealing body 92 against the force exerted by the spring 90, and letting the compressed air blow away contaminants or chips that may be present on the upper side 108.

We claim:
1. A quick chucking unit comprising:
a basic body defining a chuck receptacle;
at least one chucking element disposed at said chuck receptacle to move between a latched and unlatched position;
a piston element fixed in place relative to said basic body;
a cylinder element disposed between said piston element and said basic body, said cylinder element structured, disposed and dimensioned to move relative to said basic body and said piston element; and
a pressure means pressurizing a pressure region at which both said piston element and said cylinder element border, wherein said chucking element is moved into said latched or unlatched position in response to pressurizing said pressure region, said cylinder element being situated on said piston element so that it can shift axially and is coupled to said chucking element for radial movement thereof, wherein said chucking element does not cooperate with said piston element.

2. The quick chucking unit of claim 1, wherein said piston element is designed as a hollow piston element.

3. The quick chucking unit of claim 2, wherein an inside of said piston element facing said chuck receptacle extends in axial elongation of said chuck receptacle and is designed to sectionally and axially guide a pulling bolt that reaches into said chuck receptacle.

4. The quick chucking unit of claim 1, wherein said piston element has a continuous piston section that borders said at least one pressure region in an axial direction and which projects in a radially outward direction.

5. The quick chucking unit of claim 1, further comprising at least one spring element acting on said cylinder element to hold said chucking element in said latched position and/or to move said chucking element into said latched position.

6. The quick chucking unit of claim 1, wherein said cylinder element has a cover element that borders said pressure area on a side facing away from said chuck receptacle to surround said piston element in a ring-shaped manner.

7. The quick chucking unit of claim 1, wherein said basic body has a cylinder area that incorporates said cylinder element and can be pressurized to moveably house said cylinder element.

8. The quick chucking unit of claim 7, wherein said cylinder area and said pressure region are designed in such a way that said chucking element assumes its latched position during pressurization of said cylinder area and assumes its unlatched position during pressurization of said pressure region.

9. The quick chucking unit of claim 1, wherein, on a side facing away from said chuck receptacle, said cylinder area is sealed with a sealing element that abuts said piston element.

10. The quick chucking unit of claim 2, wherein an inside of said piston element has stops or attachment sections for subassemblies or units to be arranged in said piston element.

* * * * *